United States Patent [19]

Keinberger

[11] 4,378,916
[45] Apr. 5, 1983

[54] WIND-UP DEVICE FOR SAFETY BELTS

[75] Inventor: Franz Keinberger, Wolfsburg, Fed. Rep. of Germany

[73] Assignee: Volkswagenwerk AG, Wolfsburg, Fed. Rep. of Germany

[21] Appl. No.: 274,447

[22] Filed: Jun. 17, 1981

[30] Foreign Application Priority Data

Jun. 20, 1980 [DE] Fed. Rep. of Germany ....... 3023028

[51] Int. Cl.³ ....................... A62B 35/02; B65H 75/48
[52] U.S. Cl. ............................... 242/107.2; 242/107.3
[58] Field of Search .......... 242/107.2, 107.3, 107.4 R, 242/107.4 E; 280/806, 807, 808, 802, 803; 297/476–480

[56] References Cited

U.S. PATENT DOCUMENTS

| | | | |
|---|---|---|---|
| 3,384,415 | 5/1968 | Monroe | 242/107.3 X |
| 3,389,874 | 6/1968 | Van Noord | 242/107.2 |
| 4,249,708 | 2/1981 | Asano | 242/107.2 |
| 4,327,881 | 5/1982 | Fohl | 242/107.2 |
| 4,328,933 | 5/1982 | Loose | 242/107.2 |

FOREIGN PATENT DOCUMENTS 2355358  5/1975  Fed. Rep. of Germany ... 242/107.2

Primary Examiner—John M. Jillions
Attorney, Agent, or Firm—Spencer & Kaye

[57] ABSTRACT

A wind-up device for a vehicle safety belt, which device includes a housing, a winding system composed of a winding drum mounted in the housing for automatically winding up the belt so that a portion of the belt is wound around the drum, the drum being locked in the direction of unwinding when a given operating state occurs, and a belt braking device which includes a rotatably mounted brake roller partially surrounded by the belt and mounted for displacement between a normal position in which it is free to rotate and, when the winding drum is blocked, a braking position in which it opposes movement of the belt, movement into the braking position being effected by the tension forces acting on the belt, the braking device further including a bias spring mounted to urge the brake roller into its normal position and in which the brake roller is mounted to be displaced under the force of the belt tension to brakingly contact the outer turn of the belt portion wound on the drum.

6 Claims, 2 Drawing Figures

WIND-UP DEVICE FOR SAFETY BELTS

BACKGROUND OF THE INVENTION

The present invention relates to a wind-up device for vehicle safety belts, particularly for use in automobiles.

In order to avoid the so-called film reel effect of conventional belt winding devices, designs are known which include a belt brake device that engages when the winding drum is blocked. This braking device generally includes a braking roller which is adjustably held against the power of a spring and which is surrounded at least in part by the belt before the belt is wound on the drum. If the winding drum is blocked, this roller is displaced into a braking position by a tension force developed in the belt, creating a friction force which stops the belt. This prevents the turns of the belt, which may be wound relatively loosely on the drum, from being pulled tightly together by the belt tension, for example when there is an automobile accident. If the turns could be pulled together then, in spite of the blocked winding drum, there would result a relatively great extension of the belt which, without absorbing any significant amount of energy, would undesirably increase the forward displacement of the passenger in the vehicle, this being essentially the film reel effect.

In a prior art belt braking device, the brake roller actuates a brake element which clamps the belt into a stationary member. In another known device, the belt is braked in that the brake roller is brought into contact with a stationary member and removal of the belt is prevented merely by friction between the belt, which is wound about part of the roller, and the circumference of the brake roller which has been constructed to have a high coefficient of friction.

Both of the above-described devices are relatively complicated, particularly when reliable stopping of the belt is to be attained in order to prevent lengthening of the belt as this would require a considerable enlargement of the space provided for the wind-up device as well as a considerable increase in the number of required components.

SUMMARY OF THE INVENTION

It is therefore an object of the present invention to provide a wind-up device which is relatively simple in design, includes but few components, and assures reliable stopping of the belt to prevent the feared film reel effect.

The above and other objects are achieved, according to the invention, in a wind-up device for a vehicle safety belt, which device includes a housing, a winding system composed of a winding drum mounted in the housing for automatically winding up the belt so that a portion of the belt is wound around the drum, the drum being blocked in the direction of unwinding when a given operating state occurs, and a belt braking device which includes a rotatably mounted brake roller partially surrounded by the belt and mounted for displacement between a normal position in which it is free to rotate and, when the winding drum is blocked, a braking position in which it opposes movement of the belt, movement into the braking position being effected by the tension forces acting on the belt, the braking device further including a bias spring mounted to urge the brake roller into its normal position, by mounting the brake roller to be displaced under the force of the belt tension to brakingly contact the outer turn of the belt portion wound on the drum.

Due to the fact that the brake roller is pressed against the wound belt when the roller is displaced as a result of the belt force, the resulting brake effect is twofold. Firstly, there occurs braking as a result of friction of the belt, which is wound around part of the circumference of the brake roller, against the stopped brake roller, particularly since, according to a suitable embodiment of the invention, the brake roller circumferential surface is made of a material having a high coefficient of friction with respect to the belt, e.g. the brake roller circumference is covered with a layer of rubber. Secondly, the brake roller, when it contacts the outer turn of the belt wound on the belt winding drum, also clamps tightly the belt wound thereon so that removal of belt material from the wound belt is substantially prevented. This dual braking effect is here realized by an extremely simple structural design wherein only the brake roller and the springs acting on it are required, in addition to a slight enlargement of the wind-up housing.

DESCRIPTION OF THE PREFERRED EMBODIMENTS

Figure 1:
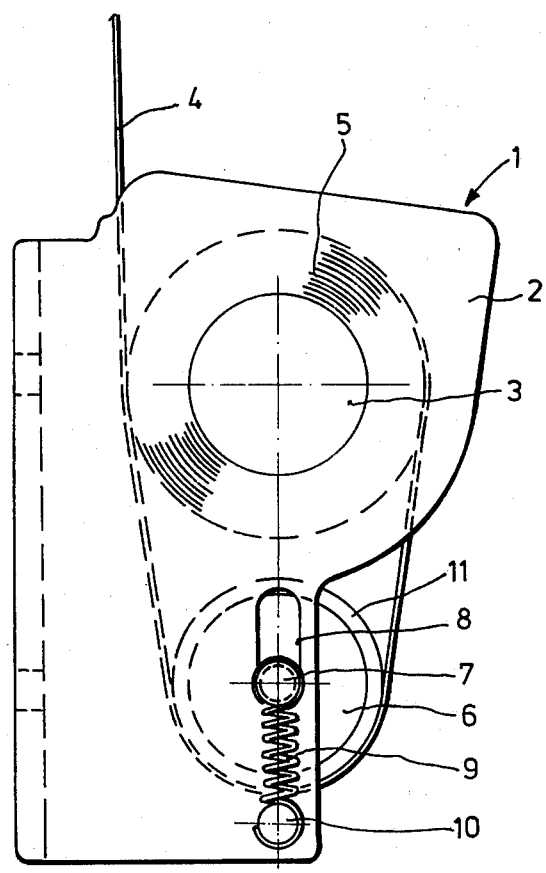
FIG. 1 is a side elevational view of a preferred embodiment of a device according to the invention.

FIG. 1 shows a wind-up device 1 whose housing side walls 2 support a wind-up drum 3 on which one end of a safety belt 4 is held to be wound up. Not shown in the drawing in detail is a spring arrangement which is associated with the wind-up drum 3 to apply a retraction force acting in the wind-up (counterclockwise) direction so as to automatically wind up the belt 4, as well as a blocking device which, upon the occurrence of extreme acceleration values in the vehicle and/or in the belt, blocks the winding drum in the unwinding direction. The operation and design of these devices to this extent correspond to those of the prior art.

Below the wind-up drum 3 there is mounted, in longitudinal slots 8 in the housing side walls 2, a shaft 7 which is associated with a brake roller 6 and which is loaded, or biased, by a spring 9. This spring 9, which here is a tension spring, for example, has one of its ends engaged in the brake roller shaft 7 and its other end at a pin 10 which is held fast in the side wall 2. Spring 9 produces a force tending to pull the brake roller 6 into the normal position shown in the drawing in which it is spaced from the wound-up portion 5 of the belt. Of course, the spring 9 could also be designed in a different manner, for example as a torsion spring.

While in this normal state shown in the drawing, the brake roller 6, whose outer circumference is provided with a brake coating 11 of a rubber material having, for example, a high coefficient of friction compared to the belt, acts as a freely rotatable guide roller for the belt entering into the wind-up device 1, for which purpose the brake roller shaft 7 is guided in the longitudinal slots 8 with play, a displacement of the brake roller 6 opposite to the effect of the tension spring 9 results, for example, when there is an automobile accident or already intensive braking of the vehicle, after the winding drum 3 has been blocked.

This displacement movement is caused by a tension force which acts in the belt 4 and which, according to the pulley principle, pulls the brake roller 6 against the wound belt 5 with double the force of the tension in belt 4. This causes, on the one hand, the wound belt 5 and roller 6 to be stopped and, on the other hand, the belt which is wound around the stopped brake roller 6 to be braked by friction. This friction effect between the brake roller 6 and the belt 4 is augmented by the friction coating applied to the circumference of the brake roller 6. The brake coating should here advisably be a rubber material whose relative coefficient of friction $\mu$ is $\geq 0.5$.

Both effects, i.e. the clamping of the belt wound on the wind-up drum 3 by means of the brake roller 11 which is pressed against the wound belt part 5, as well as the friction braking of the belt wound around the stopped brake roller 6, now have the result that in the case of retention, particularly when there is an accident, lengthening of the belt by tightening the belt turns wound relatively loosely on the blocked winding drum 3 cannot occur. The feared "film reel effect" is thus definitely avoided.

Figure 2:
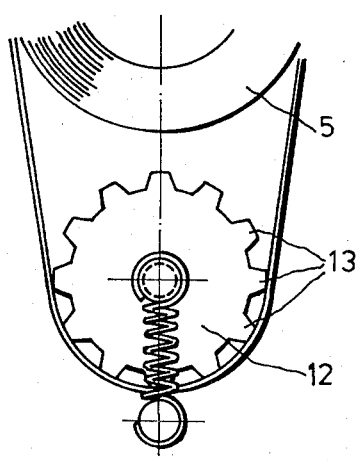
FIG. 2 is a side view of another embodiment of the brake roller used in a device according to the invention.

FIG. 2 shows a brake roller 12, which instead of heaving a brake coating of rubber material is provided with a toothed outer circumference 13. Thus the manufacture of the brake roller is simplified because it can be made as one piece by injection die-casting from plastics. In an executed embodiment the brake roller had an outer diameter of about 30 mm with 12 teeth, which were flattened at their outer circumference. With such a brake roller a high surface pressure on the belt wound on the wind-up drum was reached, which prevented the belt from tightening and lengthening by the "film reel effect".

It will be understood that the above description of the present invention is susceptible to various modifications, changes and adaptations and the same are intended to be comprehended within the meaning and range of equivalents of the appended claims.

What is claimed is:

1. In a wind-up device for a vehicle safety belt, which device includes a housing, a winding system composed of a winding drum mounted in the housing for automatically winding up the belt so that a portion of the belt is wound around the drum, the drum being blocked in the direction of unwinding when a given operating state occurs, and a belt braking device which includes a rotatably mounted brake roller partially surrounded by the belt and mounted for displacement between a normal position in which it is free to rotate and, when the winding drum is blocked, a braking position in which it opposes movement of the belt, movement into the braking position being effected by the tension forces acting on the belt, the braking device further including a bias spring mounted to urge the brake roller into its normal position, the improvement wherein said brake roller is mounted to be displaced under the force of the belt tension to brakingly contact the outer turn of the belt portion wound on said drum.

2. Wind-up device as defined in claim 1 wherein said housing includes side walls presenting guide slots in which said brake roller is held to be displaceable between its said end positions while its axis of rotation remains parallel to that of said drum.

3. Wind-up device as defined in claim 2 wherein said guide slots extend radially to the axis of said drum.

4. Wind-up device as defined in claim 1, 2 or 3 wherein said brake roller comprises a member defining the outer circumferential surface of said roller and having a high coefficient of friction with respect to the belt.

5. Wind-up device as defined in claim 4 wherein said member is a coating of a rubber material.

6. Wind-up device as defined in claim 4 wherein said member is a toothing at the outer circumference.

* * * * *